(12) United States Patent
Abbondanzio et al.

(10) Patent No.: US 8,417,688 B2
(45) Date of Patent: Apr. 9, 2013

(54) CONVERTING TWO-TIER RESOURCE MAPPING TO ONE-TIER RESOURCE MAPPING

(75) Inventors: Antonio Abbondanzio, Raleigh, NC (US); Robert B Basham, Aloha, OR (US); Vivek Kashyap, Beaverton, OR (US); Christopher V Lazzaro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 12/842,975

(22) Filed: Jul. 23, 2010

(65) Prior Publication Data

US 2012/0023071 A1    Jan. 26, 2012

(51) Int. Cl.
*G06F 7/00* (2006.01)
(52) U.S. Cl. .......................................... 707/713
(58) Field of Classification Search ................ 707/713, 707/690, 999.002
See application file for complete search history.

(56) References Cited

U.S. PATENT DOCUMENTS

| | | | | |
|---|---|---|---|---|
| 6,343,288 | B1 * | 1/2002 | Lindsay et al. | 1/1 |
| 6,862,600 | B2 * | 3/2005 | Croix et al. | 1/1 |
| 7,111,018 | B1 | 9/2006 | Goodrich et al. | |
| 7,290,003 | B1 | 10/2007 | Tong | |
| 7,509,431 | B2 | 3/2009 | Singhal et al. | |
| 7,962,496 | B2 * | 6/2011 | Gu et al. | 707/756 |
| 2003/0167258 | A1 * | 9/2003 | Koo et al. | 707/2 |
| 2005/0027850 | A1 * | 2/2005 | Menzies et al. | 709/223 |
| 2005/0050298 | A1 * | 3/2005 | Joseph | 712/1 |
| 2005/0193109 | A1 * | 9/2005 | Hudis et al. | 709/223 |
| 2006/0026195 | A1 * | 2/2006 | Gu et al. | 707/102 |
| 2007/0055555 | A1 * | 3/2007 | Baggett et al. | 705/5 |
| 2007/0294704 | A1 | 12/2007 | Stephen et al. | |
| 2008/0052673 | A1 * | 2/2008 | Hass et al. | 717/120 |
| 2008/0120327 | A1 * | 5/2008 | Bhat | 707/102 |
| 2008/0256025 | A1 * | 10/2008 | Bestgen et al. | 707/2 |
| 2010/0017422 | A1 * | 1/2010 | Sudhakar et al. | 707/101 |

OTHER PUBLICATIONS

Tosic et al, "The Common Information Model (CIM) standard—an analysis of features and open issues," 4th International Conference on Telecommunications in Modern Satellite, Oct. 1999, 4 pages.
Distributed Management Task Force, Inc. (DMTF), "Common Information Model (CIM) Specification," Jun. 14, 1999, http://www.dmtf.org/standards/cim/cim_spec_v22, 79 pages.

* cited by examiner

*Primary Examiner* — Mohammed R Uddin
(74) *Attorney, Agent, or Firm* — Kolisch Hartwell, PC; Steven L. Bennett

(57) ABSTRACT

Methods, systems and computer program products are provided for converting a two-tier resource mapping to a one-tier resource mapping. A first mapping from intermediate data buffer to a data destination may be determined. A second mapping from a data source to the intermediate data buffer may also be determined. An optimized mapping from the data source to the data destination may be generated based on the first and second mappings. The optimized mapping may then be used instead of the first and second mappings to collect data from the data source to the data destination, thereby resulting in a one-tier resource mapping. In some instances, the mappings are sets of one or more queries.

20 Claims, 9 Drawing Sheets

CONVERTING TWO-TIER RESOURCE MAPPING TO ONE-TIER RESOURCE MAPPING

BACKGROUND

The present invention relates to systems, methods and computer program products for mapping resources between entities and/or datasets such as databases and data buffers.

Businesses or other organizations that deploy information technology ("IT") resources such as computers, peripheral devices, smart phones and other hardware (referred to herein generally as "firmware resources") may track the resources using various information systems. However, firmware resources may be constantly changing or evolving. For example, computers in an office may be replaced or modified with new hardware or software as old technology becomes obsolete or too inefficient to support evolving business needs. As firmware resources change, the organization deploying the firmware may wish to update its inventory of firmware resources.

It may be difficult for an organization with a large amount of firmware resources to track changes to those resources. Accordingly, the organization may implement automated firmware resource tracking. This resource tracking may be divided into two tiers. In the first tier, a firmware resource may be configured to provide information about its own firmware to an intermediate data buffer such as a database. In some instances, the data that is received from the firmware resource may be organized in the intermediate data buffer in accordance with a standard model schema, such as the Common Information Model ("CIM"), the Simple Network Management Protocol ("SNMP"), the Network Configuration Protocol ("Netconf") and so forth.

In the second tier, data from the intermediate data buffer may be mapped to data in a data destination such as a database (e.g., a configuration management database). The data that is received from the intermediate data buffer may be organized in the data destination in accordance with a different schema than that of the intermediate data buffer, such as the Universal Systems Management Initiative ("USMi"), or the Common Data Model ("CDM").

Mappings between entities may be implemented in various ways. One way of mapping data from one dataset to another is to use one or more queries, which serve to map data from a dataset with one schema to a dataset with a different schema. For example, a firmware resource such as a computer may have an application programming interface ("API") that is configured to receive one or more queries in a nomenclature particular for that API, and return information about the firmware resource (e.g., motherboard manufacturer, power parameters such as voltage and amperage, and so forth) in response to the queries. An intermediate data buffer may be a CIM database that is configured to receive CIM queries and return information in response. A data destination may be a CDM database at which a user may define CIM queries to obtain data from the CIM database for the CDM database. Multiple queries may be organized at the data destination as a set of queries designed to obtain particular information from the firmware resource. For example, a predefined set of queries at the data destination may be configured to determine the electrical power P delivered to a particular firmware resource, and therefore may seek voltage V and current I ($P=V \times I$).

Two-tiered resource mapping may give rise to various issues. Data available at a firmware resource may not correspond directly with data at an intermediate data buffer because the two may use different schemas. However, the schema utilized at a data destination may correspond with the schema at the firmware resource. In such a scenario, data mapped from the intermediate data buffer to the data destination may experience a loss of atomicity from that which is available at the firmware resource. For example, assume that a set of queries at the data destination is designed to obtain voltage V and current I. The firmware resource API may be configured to provide both of these values, but the schema of the intermediate data buffer schema may only allow for it to receive and provide power P.

Another issue with two-tiered mappings is that data may experience a loss of precision as it traverses the two tiers. For example, a firmware resource may provide a datum with 64 bits. Even if the schema utilized at a data destination seeking this datum allows for 64-bit data, if the intermediate data buffer only supports 32-bit data, then a datum from the firmware resource may lose precision as it is obtained from the firmware resource by the intermediate data buffer and ultimately provided to the data destination.

A third issue that may arise with two-tier mappings is an aggregation bottleneck. A query to an API of a firmware resource from an intermediate data buffer may return hundreds of pieces of information, all of which may be needed at the data destination. However, multiple queries may be required to obtain the same data from the intermediate set for the data destination. Each query from the data destination to the intermediate data buffer may require a round trip of packets across a computer network, causing a bottleneck.

A fourth issue may arise where data desired from the firmware resource at the data destination is not represented by the schema of the intermediate data buffer. In such a scenario, it may be necessary to create a mapping directly from the firmware resource to the data destination.

BRIEF SUMMARY

Systems, methods and computer program products for converting two-tier resource mappings to one-tier resource mappings are provided herein. A first mapping from an intermediate data buffer to a data destination may be determined. A second mapping from a data source to the intermediate data buffer may also be determined. Based on the first and second mappings, an optimized mapping from the data source to the data destination may be generated. This generation may occur during loading or compilation of a computer program, which allows the resource mapping from the data source to the data destination to be designed as two-tier mapping and executed as a one-tier mapping.

DETAILED DESCRIPTION

Figure 1:
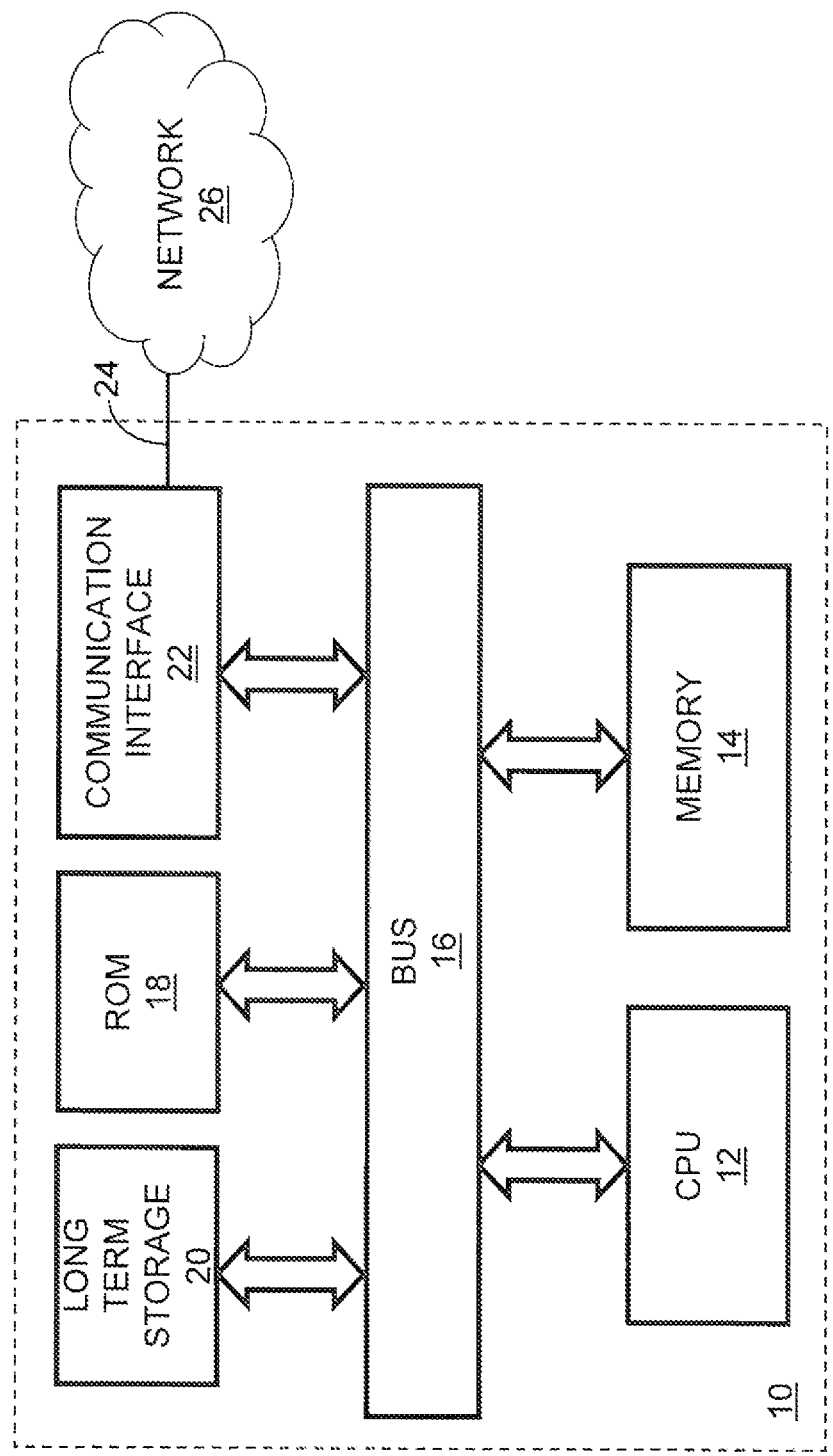
FIG. 1 depicts an exemplary data processing apparatus upon which various methods and computer programs described herein may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or cluster diagrams of methods, apparatus (systems) and computer program products according to embodiments of the invention. It will be understood that each cluster of the flowchart illustrations and/or cluster diagrams, and combinations of clusters in the flowchart illustrations and/or cluster diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or cluster diagram cluster or clusters.

These computer program instructions may also be stored in a computer readable medium that can direct computer, other programmable data processing apparatus, or other devices to function in a particular manner, such that the instructions stored in the computer readable medium produce an article of manufacture including instructions which implement the function/act specified in the flowchart and/or cluster diagram cluster or clusters.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or cluster diagram cluster or clusters.

Referring to FIG. 1, an exemplary data processing apparatus 10 is depicted. Data processing apparatus 10 may be a general or special purpose computer such as a personal computer, a laptop computer, a computer cluster (e.g., a blade system), a web server, a database server, a smart phone, a wireless email device, a tablet computer, a personal digital assistant, a network component (e.g., firewall, router, switch) and so forth. Data processing apparatus 10 may include a central processing unit 12 ("CPU") and memory 14 (e.g., RAM) operably coupled by a bus 16. Data processing apparatus 10 may include additional components, such as ROM 18, long term storage 20 (e.g., hard disk), and one or more communication interfaces 22 through which a connection 24 may be established to communicate with other data processing apparatus on a network 26. Communication interface 22 may be various types of network interfaces, such as an Ethernet card, a wireless adapter, and so forth.

Figure 2:
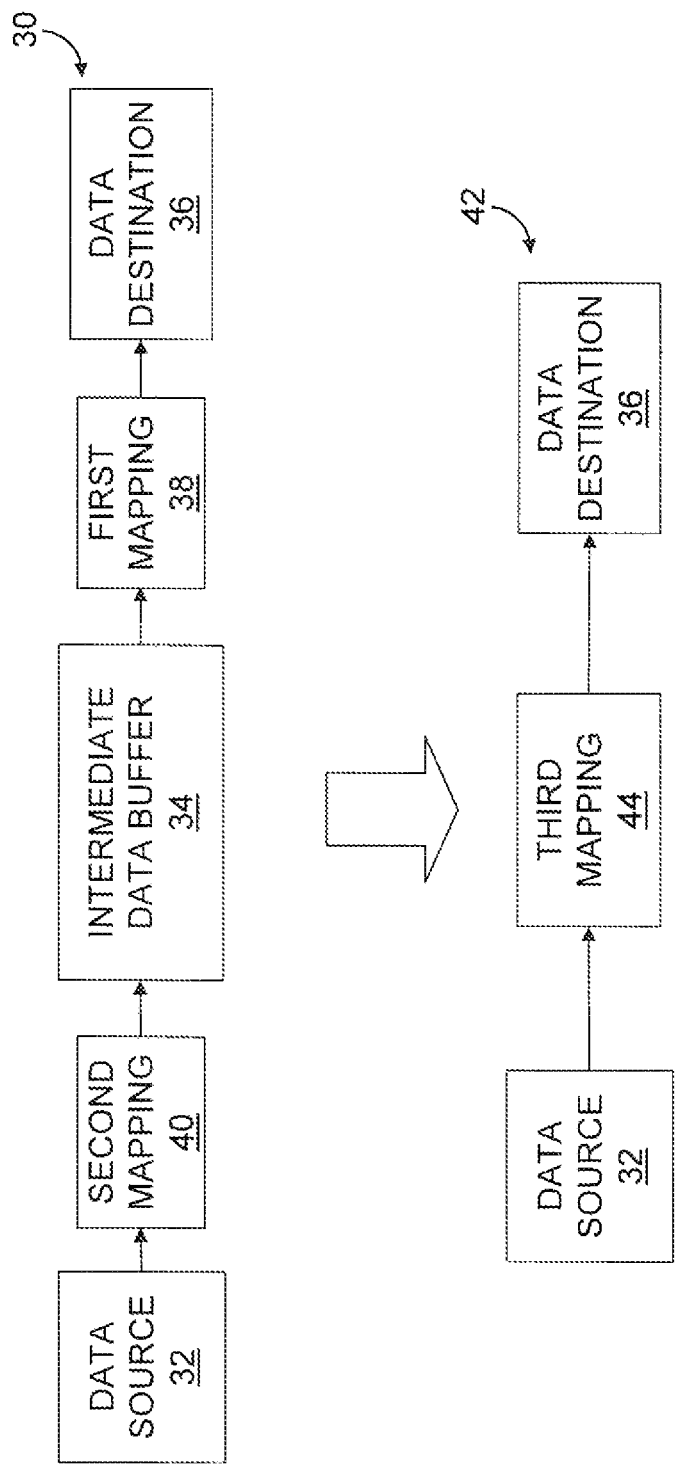
FIG. 2 depicts schematically an exemplary conversion of a two-tiered resource mapping to a one-tier resource mapping.

Referring to FIG. 2, an exemplary two-tiered resource mapping 30 includes a data source 32, an intermediate data buffer 34 and a data destination 36. Each of these entities may be hosted on one or more data processing apparatus, such as data processing apparatus 10 in FIG. 1. Additionally, more than one of these entitles may be hosted on a single data processing apparatus. Each of these entities may be configured to at least temporarily hold data, whether it is in a database, one or more files, on registers, and so forth.

A first mapping 38 includes one or more relationships between data in intermediate data buffer 34 and data destination 36. A second mapping 40 includes one or more relationships between data available at data source 32 and intermediate data buffer 34. A mapping may include one or more queries configured to relate data from a entity with one data storage schema to an entity with a different data storage schema. As used herein, a "data storage schema" will be referred to herein as a "schema," and refers to a manner in which data is organized in a particular entity.

Using systems, methods and computer program products disclosed herein, two-tier resource mapping 30 may be converted into a one-tier resource mapping 42. This conversion may be performed at various times, such as during loading or compilation of a computer program configured to obtain data from data source 32 for data destination 36. As will be described below, compile time optimizations and other steps may be performed to create a third mapping 44 which may include an optimized set of queries that avoid some of the issues with two-tiered resource mappings described above.

Figure 3:
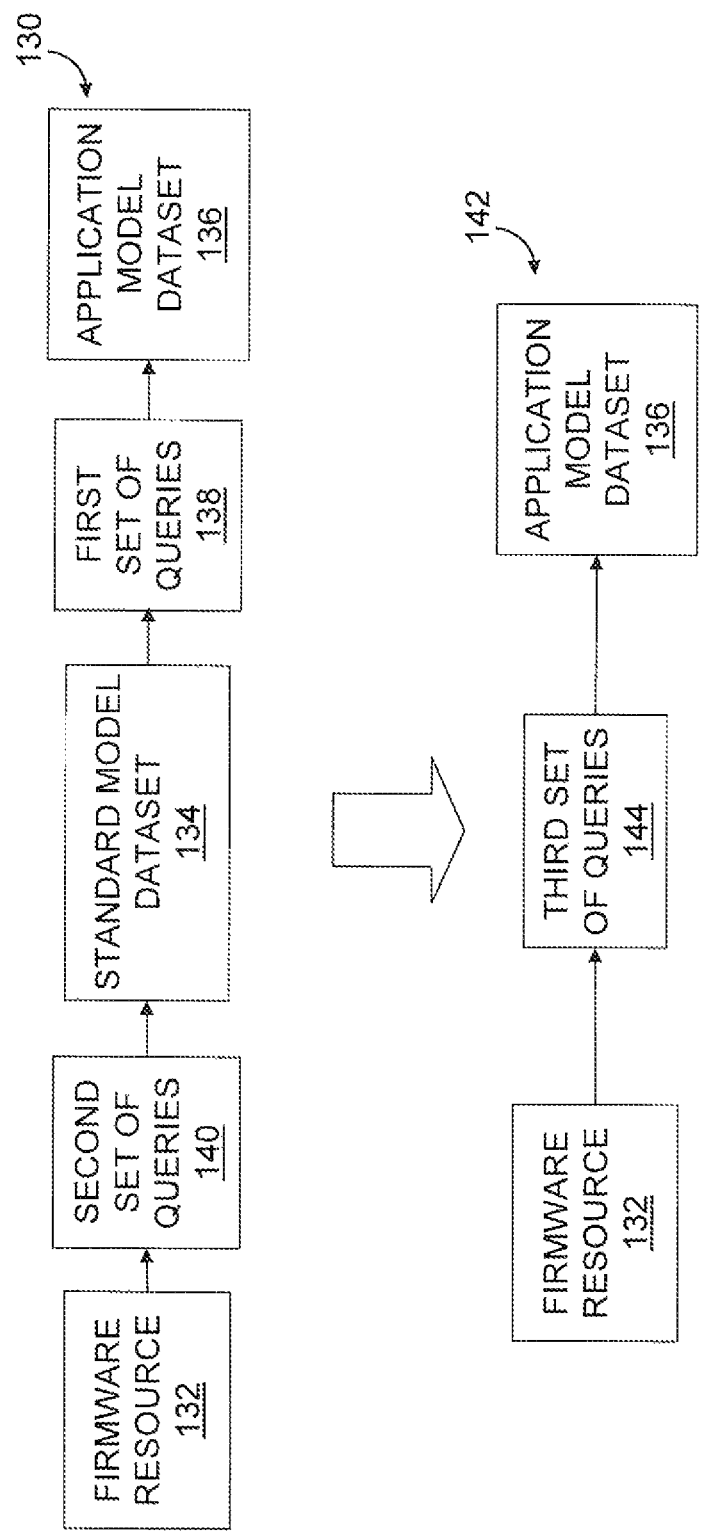
FIG. 3 depicts schematically an exemplary conversion of a two-tiered mapping from a firmware resource to an application data model dataset to a one-tier mapping.

FIG. 3 depicts another exemplary two-tier resource mapping 130 that may be converted to a one-tier mapping. In this scenario, a firmware resource 132 may include an API that is configured to provide information about firmware resource 132 upon request. A standard model dataset 134 may have a particular standard model schema (e.g., CIM, Netconf, SNMP) and may serve as an intermediate data buffer (e.g., 32 in FIG. 1) in two-tier resource mapping 130. An application model dataset 136 may have a particular application model schema (e.g., USMi, CDM) and may be the ultimate data destination (e.g., 34 in FIG. 1) in two-tier resource mapping 130.

A first set of queries 138 includes one or more queries configured to collect data from standard model dataset 134 for application model dataset 136. A second set of queries 140 includes one or more queries configured to collect data from firmware resource 132 for standard model dataset 134. Using systems, methods and computer program products disclosed herein, two-tier resource mapping 130 may be converted into a one-tier resource mapping 142 by creating a third, optimized set of queries 144 configured to collect data from firmware resource 132 for application model dataset 136 that avoids some of the issues with two-tiered resource mappings described above.

Figure 4:
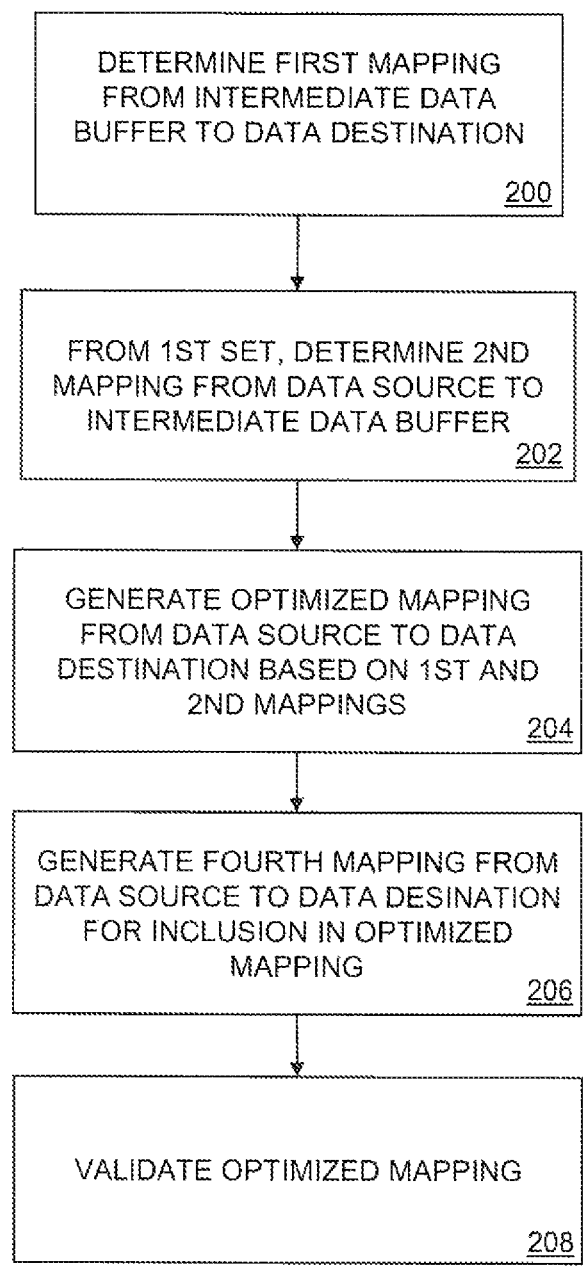
FIG. 4 depicts an exemplary method of generating an optimized mapping based on mappings from a two-tiered resource mapping.

An exemplary method of generating an optimized mapping in order to convert a two-tier resource mapping to a one-tier resource mapping is depicted in FIG. 4. Although the steps of FIG. 4 and other methods depicted in the Figures are shown in a particular order, this is not meant to be limiting, as the steps may be performed in various other orders as well.

Figure 6:
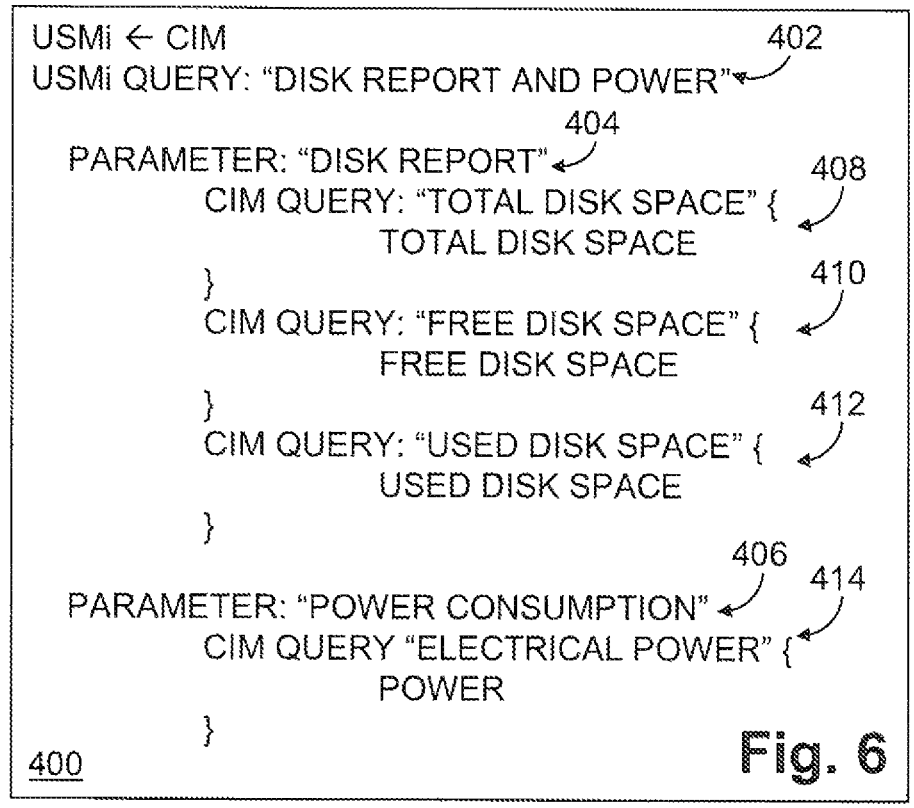
FIG. 6 depicts an exemplary set of queries designed to collect information from an intermediate data buffer for a data destination.

At step 200, a first mapping (e.g., first mapping 38 in FIG. 2; first set of queries 138 in FIG. 3) from an intermediate data buffer (e.g., intermediate data buffer 34 of FIG. 2; standard model dataset 134 in FIG. 3) to a data destination (e.g., data destination 36 of FIG. 2; application model dataset 136 in FIG. 3) is determined. The first set of queries may be determined in various ways. For example, application model dataset 136 of FIG. 3 may be hosted on a data processing apparatus that is configured to track firmware resources for an organization. One or more mappings may be created and/or predefined on the data processing apparatus in the form of templates designed to obtain particular information from one or more firmware resources under the organization's control. An example template is shown in FIG. 6 and will be discussed below.

In step 202, a second mapping (e.g. second mapping 40 in FIG. 2; second set of queries 140 in FIG. 3) from a data source (e.g., data source 32 in FIG. 2; firmware resource 132 in FIG. 3) to the intermediate data buffer is determined. The second mapping may be determined in various ways and may be based on the first mapping, as will be discussed below.

In step 204, an optimized mapping (e.g., third mapping 44 in FIG. 2; third set of queries 144 in FIG. 3) is generated based on the determined first and second mappings. The optimized mapping may then be used instead of the first and second mappings in order to make the process of obtaining data from the data source for the data destination more efficient, specifically by foregoing the intermediate data buffer. The optimized mapping may be generated at various points in time, such as during loading or compilation of a computer program configured to obtain from a data source for a data destination. Thus, a user may still design and create source code for the computer program based on a two-tier model, but the resulting computer program will execute as a one-tier model.

As noted above, in some two-tier resource mappings there are instances where a datum desired from a data source at the data destination is not represented by the schema of or stored by the intermediate data buffer. A similar issue arises where data experiences a loss of precision as it traverses the two tiers. For example, a firmware resource (e.g., 132 in FIG. 3)) may provide a datum with 64 bits. Even if the schema utilized at an application model dataset (136 in FIG. 3) allows for 64-bit data, if the intermediate standard model data buffer (134 in FIG. 3) only supports 32-bit data, then a datum from the firmware resource may lose precision as it is obtained from the firmware resource by the standard model data buffer and ultimately provided to the application model dataset.

In such scenarios, a mapping may be created directly from the firmware resource to the data destination to avoid the loss of data or data precision. For example, in step 206 of FIG. 4, a fourth mapping from the data source (e.g., data source 32 in FIG. 2; firmware resource 132 in FIG. 3) to the data destination (e.g., data destination 36 in FIG. 2; application data model dataset 136 in FIG. 3) may be generated and included with the third mapping (e.g., third mapping 44 in FIG. 2; third set of queries 144 in FIG. 3). The fourth mapping may serve to prevent a loss of data where an intermediate data buffer does not support a particular datum, or to maintain a precision of a datum where an intermediate data buffer does not store the datum with the same precision as the data source or data destination.

In step 208, the optimized mapping generated in steps 204 and 206 may be validated. For example, assume the mappings are sets of queries such as first set of queries 138, second set of queries 140 and third set of queries 144 in FIG. 3. First set of queries 138 and second set of queries 140 may be executed, and the data ultimately collected may be compared to data separately collected using third set of queries 144. In some instances, boundary cases may be utilized as input data. If the data collected by the first and second sets of queries (138, 140) matches data collected by third set of queries 144, then third set of queries 144 may be considered validated. If the collected data does not match, then it may be determined that third set of queries 144 is not valid.

Figure 5:
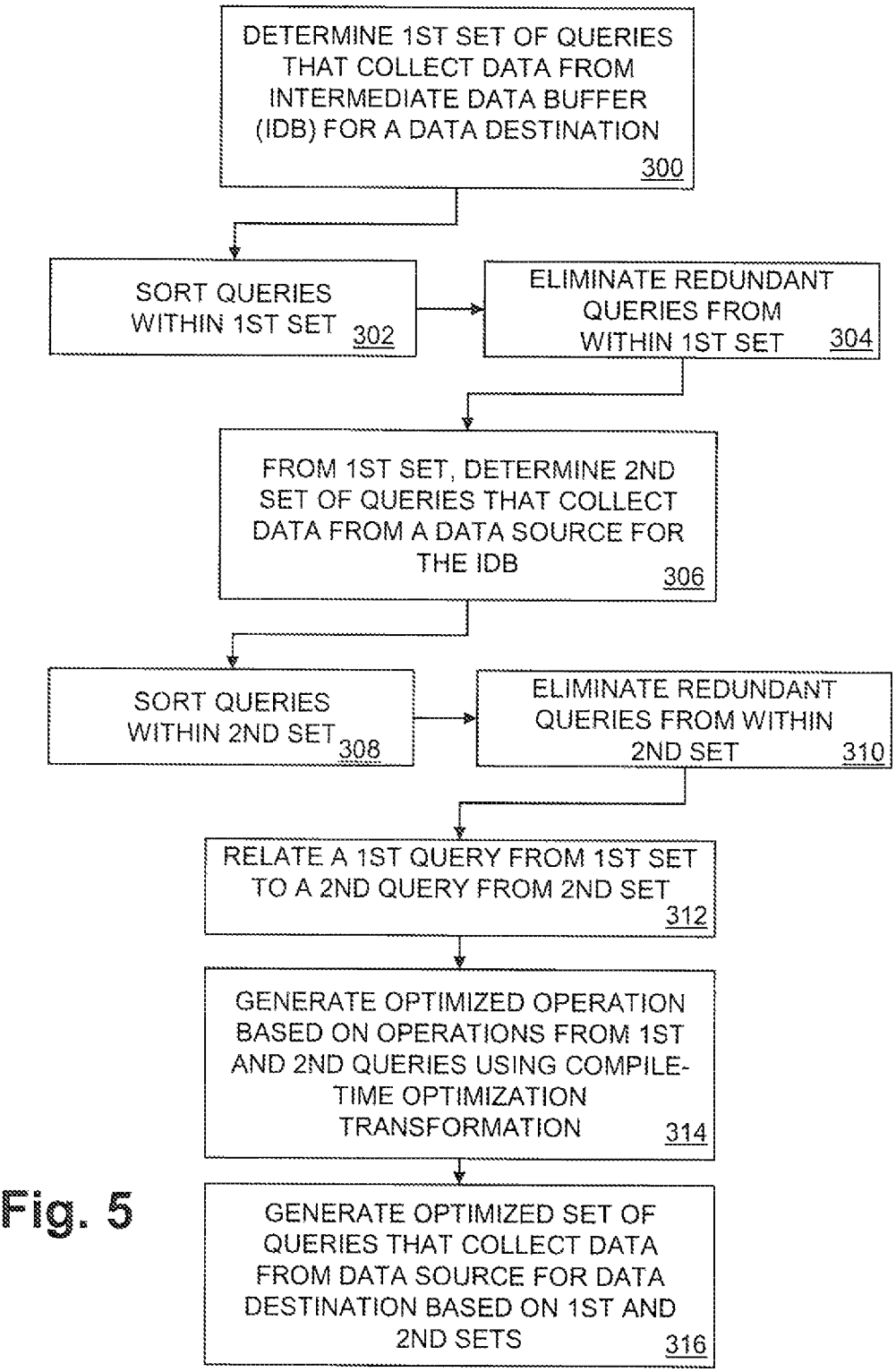
FIG. 5 depicts an exemplary method of generating an optimized set of queries based on queries from a two-tier resource mapping

Similar to FIG. 4, FIG. 5 depicts an exemplary method of generating an optimized set of queries in order to convert a two-tier resource mapping to a one-tier resource mapping. In step 300, similar to step 200 in FIG. 4, a first set of queries (e.g., first set of queries 138 in FIG. 3) that collect data from an intermediate data buffer (e.g., intermediate data buffer 34 of FIG. 2; standard model dataset 134 in FIG. 3) for a data destination (e.g., data destination 36 of FIG. 2; application model dataset 136 in FIG. 3) is determined. As noted above for mappings, the first set of queries may be determined in various ways. For instance, one or more queries may be included in a template on the computer system hosting application model dataset 136 in FIG. 3.

Referring to FIGS. 3 and 5, assume the schema of application model dataset 138 is USMi and the schema of standard model dataset 134 is CIM. First set of queries 138 may be a set of CIM queries selected to obtain particular pieces of data from standard model dataset 134 for application model dataset 138. An exemplary set of such queries is shown in FIG. 6 in the form of a CIM-to-USMi template 400. Although template 400 is depicted in FIG. 6 in a generic format, this is not meant to be limiting, and templates and other files described herein may be in various formats (e.g., XML, binary).

Template 400 of FIG. 6 is designed to obtain a disk report and power information of one or more firmware resources. Template 400 includes a title 402 ("DISK REPORT AND POWER"), a first desired parameter 404 (labeled "DISK REPORT") and a second desired parameter 406 (labeled "POWER CONSUMPTION"). First desired parameter 404 seeks the total disk space, free disk space and used disk space on a particular firmware resource. In order to collect these pieces of data from standard model dataset 134, however, three separate CIM queries (408, 410, 412) are necessary because as will be seen below, standard model dataset 134 in this example only provides these pieces of data on an individual basis. Second desired parameter 406 ("POWER CONSUMPTION") seeks voltage V and current I at a particular firmware resource, but because standard model dataset 134 only includes power P, second desired parameter 406 includes a single CIM query 416 for obtaining power P from standard model dataset 134. Accordingly, the first set of queries determined at step 300 in FIG. 5 in this example may include the CIM queries 408-414.

Referring back to FIG. 5, in step 302, the queries of the first set (408-414) are sorted so that any redundant queries are adjacent. In FIG. 6, for example, the CIM queries 408-414 could be sorted alphabetically. In step 304, redundant queries, if any, are eliminated from the first set of queries. In the example template 400 of FIG. 6, there are no redundant CIM queries, and so none would be eliminated. In some instances, more complex methods may be utilized to eliminate or modify sets of queries to be more efficient. For example the Lempel-Ziv algorithm or its variants may be implemented on sets of queries in order to eliminate redundancies and/or reduce the number of queries required.

In step 306, similar to step 202 in FIG. 4, a second set of queries (e.g., 140 in FIG. 3) that collect data from a data source (e.g., data source 32 in FIG. 2; firmware resource 132 in FIG. 3) for an intermediate data buffer (e.g., intermediate data buffer 34 in FIG. 2; standard data model 134 in FIG. 3) is determined. The second set of queries may be determined based upon the first set of queries. For example, if the first set of queries is a set of CIM queries (e.g., 408-414 of FIG. 6) selected to obtain particular pieces of data from standard model dataset 134 in FIG. 3, then the second set of queries may include queries necessary to collect corresponding data from firmware resource 132 for standard model dataset 134. Like the queries forming the first set of queries, the queries forming the set second of queries may be determined from one or more templates on a data processing system serving hosting the standard model dataset 134.

Figure 7:
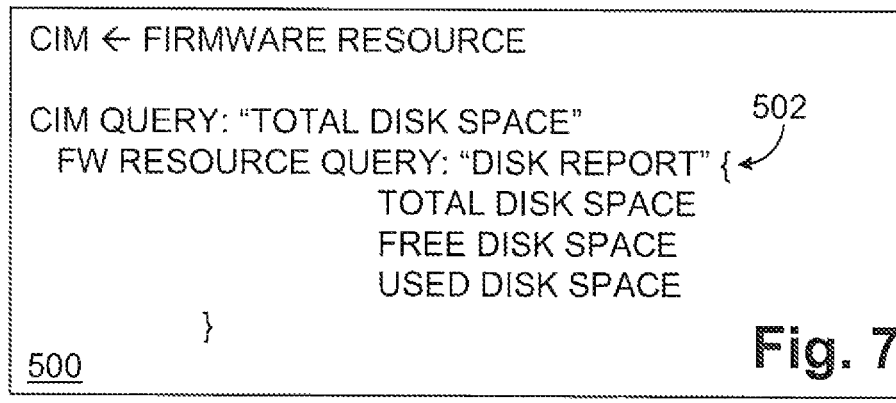
FIGS. 7-10 depict exemplary sets of queries designed to collect information from a data source for an intermediate data buffer.

Exemplary firmware resource-to-CIM templates are depicted in FIGS. 7-11. FIG. 7 depicts a firmware resource-to-CIM template 500 that corresponds to CIM query 410 ("TOTAL DISK SPACE") in FIG. 6. A firmware resource query 502 entitled "DISK REPORT" corresponds to CIM query 408 and seeks three pieces of data from a firmware resource: total disk space; free disk space; and used disk space.

Figure 8:
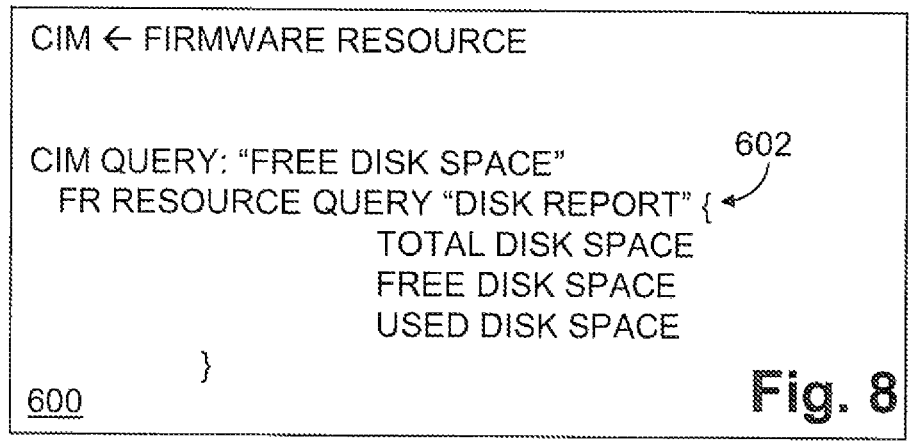

Another firmware resource-to-CIM template 600 is shown in FIG. 8 that corresponds to CIM query 410 ("FREE DISK SPACE") in FIG. 6. A firmware resource query 602 that is identical to firmware resource query 502 is entitled "DISK REPORT" and seeks the same three pieces of data.

Figure 9:
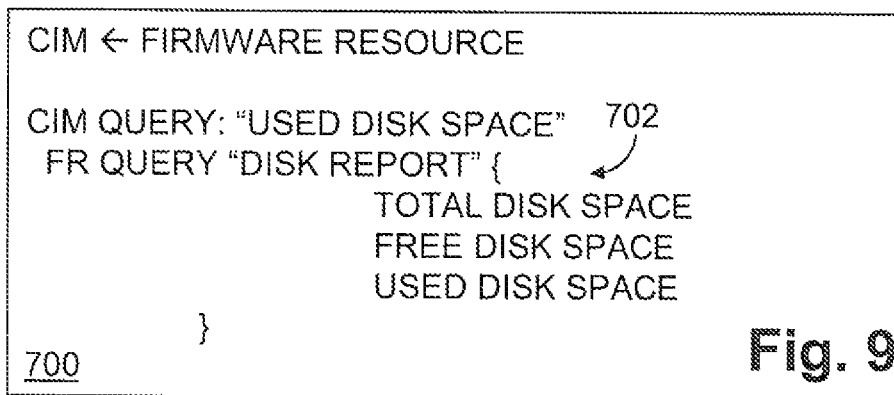

Another firmware resource-to-CIM template 700 is shown in FIG. 9 that corresponds to CIM query 412 ("USED DISK SPACE") in FIG. 6. A firmware resource query 702 that is identical to firmware resource queries 502 and 602 is entitled "DISK REPORT" and seeks the same three pieces of data.

Figure 10:
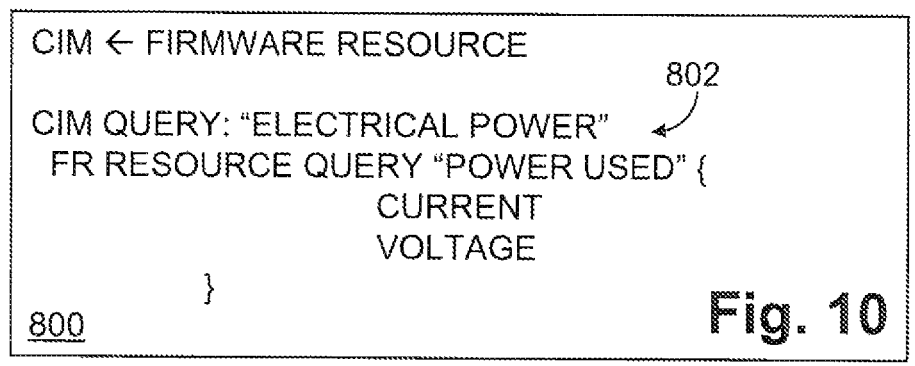

FIG. 10 depicts another firmware resource-to-CIM template 800 that corresponds to CIM query 416 ("POWER") in FIG. 7. A firmware resource query 802 entitled "POWER USED" is associated with CIM query 416 and seeks two pieces of data from a firmware resource: current I and voltage V.

Figure 11:
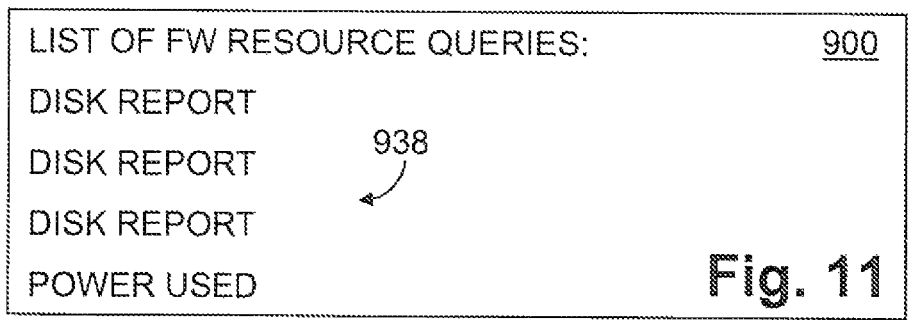
FIG. 11 depicts a set of queries determined from the sets of queries shown in FIGS. 6-10 as they may be sorted to eliminate redundant queries.

FIG. 11 depicts an exemplary second set of queries 938 (e.g., 138 in FIG. 3) that may be determined in step 306 of FIG. 5. In particular, second set of queries 938 in FIG. 11 is determined based on the first set of CIM queries 408-414 in template 400 and using the templates (500, 600, 700, 800) depicted in FIGS. 7-10 to determine a second set of firmware resource queries that ultimately are executed. It can be seen that the same firmware resource query entitled "DISK REPORT" will be executed three times and that the firmware resource query entitled "POWER USED" will be executed once.

Referring back to FIG. 5, in step 308, second set of queries (938 in FIG. 11) may be sorted so that redundant queries are adjacent. In FIG. 11, second set of queries 938 is already sorted, so that the three instances of the firmware resource query entitled "DISK REPORT" that are redundant are also adjacent. In step 310, redundant queries are eliminated from the second set of queries. For example, in the second set of queries 938 of FIG. 11, two instances of the DISK REPORT firmware resource query are eliminated.

In addition to eliminating redundant queries, other techniques such as compile-time optimization techniques may be implemented to convert a two-tier resource mapping to a one-tier resource mapping. Compile-time optimization techniques may serve to minimize time taken to execute the resulting computer program and/or to minimize the amount of memory required by the computer program. Examples of compile-time techniques include loop modifications (e.g., distribution, inversion, interchange, reversal, unrolling, splitting, combining), pipelining, parallelization, subexpression elimination, induction variable analysis, pointer analysis, recursion removal, bounds checking elimination, stack height reduction, and so forth.

For example, in addition to collecting one or more pieces of data from one entity for another entity, a query may include operations to alter data. An operation may include a mathematical equation (e.g., $P = I \times V$), instructions to convert a datum from one format to another format (e.g., little endian to big endian, 32-bit to 64-bit), or any other instruction or set of instructions that serve to alter a datum to a different form as necessary for a particular schema.

Figure 12:
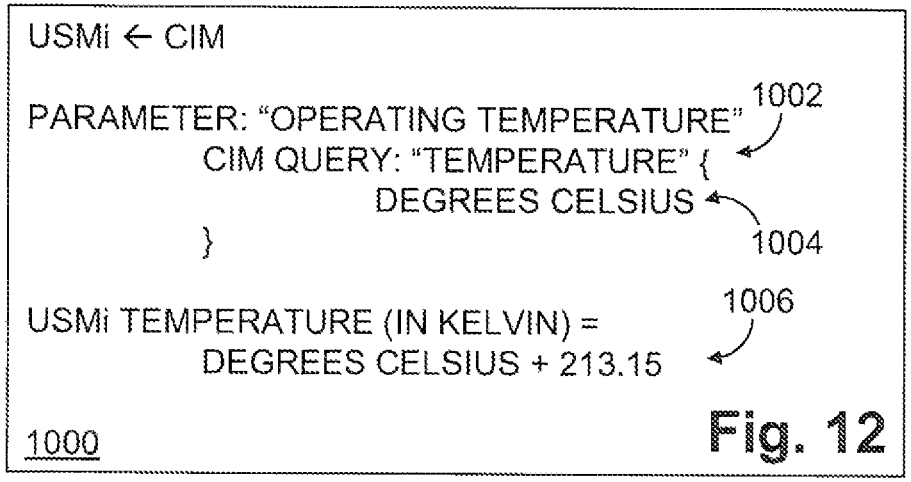
FIG. 12 depicts an exemplary set of queries designed to obtain information from an intermediate data buffer for a data destination.

An example operation is shown in FIG. 12. A CIM-to-USMi template 1000 includes a CIM query 1002 that collects an operating temperature 1004 from a standard model dataset (e.g., standard model dataset 134 in FIG. 3) for an application model dataset (e.g., application model dataset 136 in FIG. 3). However, the standard model dataset's schema may dictate that operating temperatures are stored in Celsius, while the application model dataset's schema may dictate that operating temperatures are stored in Kelvin. Accordingly, template 1000 includes an operation 1006 that transforms data received from a standard model dataset from Celsius to Kelvin (DEGREES KELVIN=DEGREES CELSIUS+ 213.5).

Figure 13:
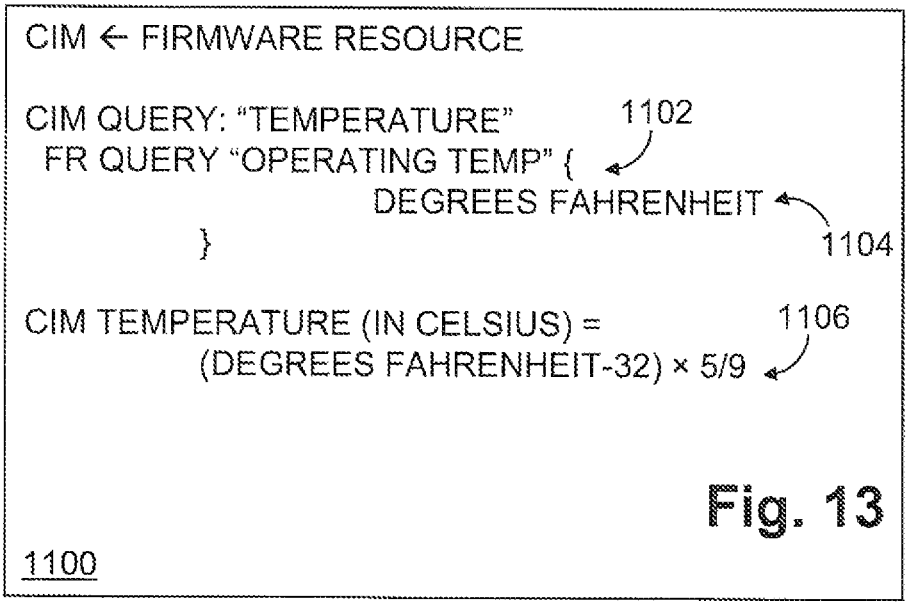
FIG. 13 depicts an exemplary set of queries designed to collect information from a data source for an intermediate data buffer.

A similar situation may occur between a data source and an intermediate data buffer. FIG. 13 depicts a firmware resource-to-CIM template 1100 that corresponds to CIM query 1002 in FIG. 12. Template 1100 includes a firmware resource query 1102 entitled "OPERATING TEMP" that returns the operating temperature 1104 of a particular firmware resource. However, the firmware resource only provides its operating temperature in Fahrenheit. Accordingly, firmware resource query 1102 includes an operation 1106 that transforms Fahrenheit data to Celsius data (i.e. DEGREES CELSIUS=(DEGREES FAHRENHEIT−32)×5/9).

Referring back to FIG. 5, in step 312, a first query from the first set of queries (e.g., first set of queries 138 in FIG. 3) may be related to a second query from the second set of queries (e.g., second set of queries 140 in FIG. 3). For example, CIM query 1002 in FIG. 12 may be related to firmware resource query 1102 in FIG. 13 because they both are configured to collect an operating temperature of a particular firmware resource.

In step 314 of FIG. 5, an optimized operation is generated based on operations from the first and second queries using a compile-time optimization transformation. For example, an optimized operation configured to convert Fahrenheit directly to Kelvin (i.e. DEGREES KELVIN=(DEGREES FAHRENHEIT+459.67)×5/9) may be generated so that an operating temperature obtained from a firmware resource may be collected directly and more efficiently by foregoing the conversion to Celsius required by a application data model dataset (e.g., application model dataset 136 in FIG. 3).

In step 316 of FIG. 5, similar to step 204 in FIG. 4, an optimized set of queries that collect data from a data source (e.g., data source 32 in FIG. 2; firmware resource 132 in FIG. 3) for a data destination (e.g., data destination 36 in FIG. 2; application model dataset 136 in FIG. 3) may be generated. As before, these may be generating during loading or compilation of a computer program configured to collect data from a data source for a data destination. The resulting computer program may then forego an intermediate data buffer (e.g., intermediate data buffer 34 in FIG. 2; standard model dataset 134 in FIG. 3) during runtime. Optimized operations generated in step 314 may be included within queries of the optimized set of queries.

The flowchart and cluster diagrams in the Figures illustrate the architecture, functionality, and operation of possible implementations of systems, methods and computer program products according to various embodiments of the present invention. In this regard, each cluster in the flowchart or cluster diagrams may represent a module, segment, or portion of code, which comprises one or more executable instructions for implementing the specified logical function(s). It should also be noted that, in some alternative implementations, the functions noted in the cluster may occur out of the order noted in the figures. For example, two clusters shown in succession may, in fact, be executed substantially concurrently, or the clusters may sometimes be executed in the reverse order, depending upon the functionality involved. It will also be noted that each cluster of the cluster diagrams and/or flowchart illustration, and combinations of clusters in the cluster diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or clusters thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of generating an optimized set of queries, comprising:
    determining a first set of queries that collect data from a standard model dataset to an application model dataset, wherein the standard model dataset includes one of a Common Information Model (CIM), a Simple Network Management Protocol (SNMP) and a Network Configuration Protocol (Netconf), and the application model dataset includes one of a Universal Systems Management Initiative (USMi) and a Common Data Model (CDM);
    determining, from the first set of queries, a second set of queries that collect data from a firmware resource to the standard model dataset;
    generating, by a computer, a two-tier resource mapping for the first and second sets of queries, converted into one-tier resource mapping by creating a third optimized set of queries that collect data from the firmware resource to the application model dataset; and
    generating the third optimized set of queries during compilation of a computer program configured to collect data from a data source for a data destination.

2. The method of claim 1, further comprising generating the third optimized set of queries during loading of the computer program configured to collect data from the data source for the data destination.

3. The method of claim 1, further comprising eliminating redundant queries from within the first set and from within the second set, and sorting queries within the first set and within the second set.

4. The method of claim 3, further comprising relating a first query from the first set of queries to a second query from the second set of queries.

5. The method of claim 4, further comprising
    determining a first operation associated with the first query;
    determining a second operation associated with the second query;
    generating an optimized operation based on the first and second operations using a compile-time optimization transformation.

6. The method of claim 1, further comprising generating, as part of the third query, a relationship from a datum from the firmware resource to a corresponding datum in the application model dataset that maintains a precision of the datum.

7. The method of claim 6, further comprising utilizing an equation to convert a datum from one format to a different format.

8. The method of claim 7, further comprising generating the third query during compilation of a computer program configured to collect data from the firmware resource for the application model dataset.

9. The method of claim 8, further comprising generating the third query during loading of a computer program configured to collect data from the firmware source for the application model dataset.

10. The method of claim 9, wherein the firmware resource is one of a computer, a peripheral device, and a smart phone.

11. The method of claim 1, further comprising determining, from the first set of queries, the second set of queries that collect data from the firmware resource to the standard model dataset, wherein the standard model dataset includes the CIM, the SNMP and the Netconf, the application model dataset includes the USMi and the CDM, and the firmware resource includes a firmware application programming interface (API).

12. A system for converting a two-tiered resource mapping into a single-tier resource mapping, comprising:
 a processor;
 a memory; and
 a resource mapping optimization program including a plurality of instructions stored in the memory that are executed by the processor to:
  determine a first set of queries that collect data from a standard model dataset for an application model dataset, wherein the standard model dataset includes one or more of a Common Information Model (CIM), a Simple Network Management Protocol (SNMP) and a Network Configuration Protocol (Netconf), and the application model dataset includes one or both of a Universal Systems Management Initiative (USMi) and a Common Data Model (CDM);
  determine, from the first set of queries, a second set of queries that collect data from a firmware resource for the standard model dataset; and
  generate a two-tier resource mapping for the first and second sets of queries, converted into one-tier resource mapping by creating a third optimized set of queries that collect data from the firmware resource for the application model dataset,
  wherein the third optimized set of queries is generated during compilation of a computer program configured to collect data from a data source for a data destination.

13. The system of claim 12, wherein the plurality of instructions further includes instructions that are executed by the processor to:
 determine a first operation associated with a query in the first set of queries;
 determine a second operation associated with a query in the second set of queries; and
 generate an optimized operation based on the first and second operations using a compile-time optimization transformation.

14. The system of claim 13, wherein generating the third optimized set of queries includes performing Lempel-Ziv compression on one or both of the first and second sets of queries.

15. A computer program product for converting a two-tiered resource mapping into a single-tier resource mapping, said computer program product including a plurality of computer executable instructions stored on a non-transitory computer readable medium, wherein said instructions are executed by a computer to:
 determine a first set of queries that collect data from a standard model dataset to an application data model dataset, wherein the standard model dataset includes one of a Common Information Model (CIM), a Simple Network Management Protocol (SNMP) and a Network Configuration Protocol (Netconf), and the application data model dataset includes one of a Universal Systems Management Initiative (USMi) and a Common Data Model (CDM);
 determine a second set of queries that collect data from a firmware resource to the standard model dataset; and
 generate, by a computer, a two-tier resource mapping for the first and second sets of queries, converted into one-tier resource mapping by creating a third optimized set of queries that collect data from the firmware resource to the application data model dataset,
 wherein the third optimized set of queries is generated during compilation of a computer program configured to collect data from a data source for a data destination.

16. The computer program product of claim 15, wherein the firmware resource includes a firmware application programming interface (API).

17. The computer program product of claim 15, wherein the plurality of computer executable instructions are further executed by the computer to:
 determine a fourth query from the firmware resource to the application data model dataset; and
 include the fourth query with the third query.

18. The computer program product of claim 15, wherein the plurality of computer executable instructions are further executed by the computer to:
 generate, as part of the third query, a relationship from a datum from the firmware resource to a corresponding datum in the application data model dataset that maintains a precision of the datum.

19. The computer program product of claim 15, wherein the third query is generated during loading of the computer program configured to collect data from the firmware source for the application data model dataset.

20. The computer program product of claim 15, wherein the plurality of computer executable instructions are further executed by the computer to:
 determine, from the first set of queries, the second set of queries that collect data from the firmware resource to the standard model dataset, wherein the standard model dataset includes the CIM, the SNMP and the Netconf, and the application data model dataset includes the USMi and the CDM.

* * * * *